United States Patent [19]

Ford et al.

[11] 3,944,504

[45] Mar. 16, 1976

[54] CATALYST FOR THE DIMINUTION OF AUTOMOBILE EXHAUST GASES

[75] Inventors: James A. Ford, St. Louis, Mo.;
 Sheldon H. Butt, Godfrey, Ill.

[73] Assignee: Olin Corporation, New Haven, Conn.

[22] Filed: Jan. 20, 1975

[21] Appl. No.: 542,184

Related U.S. Application Data

[63] Continuation-in-part of Ser. No. 454,388, March 25, 1974, abandoned.

[52] U.S. Cl. ... 252/455 R; 252/466 B; 252/466 PT; 423/213.5
[51] Int. Cl.² . B01J 21/04; B01J 23/40; B01J 23/74
[58] Field of Search ...... 252/455 R, 466 B, 466 PT; 423/213.2, 213.5; 427/320

[56] References Cited
 UNITED STATES PATENTS

| | | | |
|---|---|---|---|
| 3,437,605 | 4/1969 | Keith | 252/477 R |
| 3,565,574 | 2/1971 | Kearby et al. | 252/474 X |
| 3,773,894 | 11/1973 | Bernstein et al. | 423/213.5 |

*Primary Examiner*—W. J. Shine
*Attorney, Agent, or Firm*—Robert H. Bachman; David A. Jackson

[57] ABSTRACT

A catalyst for the diminution of automobile pollution and a method for forming the catalyst are described. The catalyst comprises a metal alloy substrate having a specified composition, an oxide layer containing a large proportion of alumina on the surface of the alloy and a surface layer comprising from 60 to 100% platinum and from 0 to 40% palladium.

12 Claims, 6 Drawing Figures

CATALYST FOR THE DIMINUTION OF AUTOMOBILE EXHAUST GASES

CROSS REFERENCE TO RELATED APPLICATION

This application is a continuation-in-part of copending application Ser. No. 454,388 by James A. Ford and Sheldon H. Butt for "Catalyst For The Diminution Of Automobile Exhaust Gases," filed Mar. 25, 1974 now abandoned.

BACKGROUND OF THE INVENTION

The field of automotive emission controls represents an area which is receiving a great deal of attention, particularly as government regulations concerning automotive pollution become more and more strict. It is now accepted that some sort of catalytic control system will be necessary in order that automobiles may meet future regulations, particularly with regard to emissions of oxides of nitrogen.

Past research has demonstrated that noble metals such as platinum and palladium are among the most effective known catalysts for the diminution of automobile exhaust gases. Unfortunately, these metals are extremely expensive and it is necessary that some means be derived to minimize the amount of noble metal used while maximizing the surface area. The obvious solution is to apply a very thin layer of noble metal to a substrate. Substrates which have been experimentally used include ceramics such as ceramic honeycombs and metal alloys. The ceramic substrates suffer from the defect of being excessively brittle and are susceptible to both thermal and mechanical shock. Attempts to apply a thin noble metal layer to a metallic substrate have generally been unsuccessful because at the high temperature encountered in operation, the noble metal soon diffuses into the substrate losing its effectiveness.

SUMMARY OF THE INVENTION

The present invention consists of a catalyst for use in the diminution of automotive pollution and a method for fabricating catalysts.

The catalysts described in the present application possess a unique combination of effectiveness, durability and low cost. The catalysts of the present invention comprise an alloy substrate having extreme resistance to high temperature oxidation, nitridation and sulfidation, and a metallic layer on the surface of the substrate which comprises a platinum-palladium alloy layer. Interposed between the alloy substrate and the platinum-palladium layer is an oxide layer containing a major proportion of alumina.

It is a primary object of the present invention to provide a highly effective catalyst for the diminution of carbon monoxide and hydrocarbons in automotive exhaust gases.

It is a further object of the present invention to provide a low cost catalyst for use in automotive pollution control systems.

Yet another object of the present invention is to provide a highly durable noble metal catalyst for the diminution of air pollution.

DESCRIPTION OF THE PREFERRED EMBODIMENTS

Figure 1:
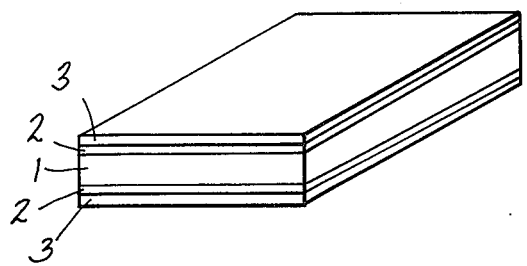
FIG. 1 shows the composite catalyst of the present invention, in its final layered form.

The present invention provides a catalyst which consists of a layer of noble metal over the surface of a metal-ceramic composite material. In particular, the present invention consists of a method for forming the metal-ceramic composite and applying a layer of noble metal catalyst to the surface thereof. The metal-ceramic composite is extremely resistant to thermal and mechanical stresses and also possesses resistance to furtner oxidation, while maintaining adequate mechanical properties at operating temperatures. The ceramic layer prevents the noble metal catalytic layer from diffusing into the substrate.

The alloy from which the metal-ceramic composite is formed is a nickel-base alloy containing more than 50% by weight of nickel, and preferably more than 80% by weight of nickel, and comprising 2 to 6% by weight of aluminum, the nickel content thus being within the range of 50 to 98%. Additional alloying elements of which one or more may be present are up to 6% by weight silicon, chromium, magnesium, manganese, cobalt, copper or others, and up to 20% iron, so that the resulting useful alloys are characterized by a single-phase matrix, wherein aluminum is retained in solid solution. In some instances, fine particles of precipitated intermetallic complexes may be present within the grains or at grain boundaries, such alloys likewise being considered as having a single-phase matrix. Alloys having compositions and characteristics as above specified are capable upon oxidation at elevated temperatures of producing a continuous dense adherent surface layer of oxide comprising a major proportion of aluminum oxide, aluminum being generally the most readily oxidized metal present in the alloy in substantial proportions. Such alloys are also characterized by adequate mechanical strength properties at the high operating temperatures, as exemplified by a tensile yield strength in excess of 5 ksi at about the maximum temperature encountered in service, 700° to 1,000°C. The latter requirement is one that cannot be met by low melting alloys such as aluminum base alloys.

Preferably, the metal substrate in accordance with the invention contains 2 to 6% by weight aluminum, 0.5 to 4% silicon, 0.001 to 6% chromium, with the balance essentially nickel. The most highly preferred substrate alloy compositions are those which contain 3 to 5% aluminum, 2 to 3.5% silicon, and 3 to 5% chromium. Further elements may likewise be present, as for example, 0.001 to 0.4% manganese to facilitate hot rolling of the alloy, and 0.001 to 1.0% magnesium for deoxidation of the molten alloy prior to casting. Such alloy compositions and properties thereof are as disclosed in detail in our U.S. Pat. No. 3,810,754 issued May 14, 1974, the disclosure of which is incorporated herein by reference.

As stated above, the ceramic portion of the composite substrate is predominantly comprised of alumina and is formed on the surface by a high temperature oxidation step. The thickness of the film will vary widely depending upon the alloy composition and the oxidation conditions, but in general will range from 100° to 10,000 A and preferably from 200° to 5,000 A. As those skilled in the art will appreciate the oxidation conditions must be chosen with reference to the alloy system upon which the oxide is to be formed. In general, however, the oxidation conditions will range from 350° to 1,000°C and preferably from 500° to 900°C in an oxidizing atmosphere, which may contain water vapor, for a time of from 1 minute to 20 hours. It will also be appreciated that some control of the oxide film thickness, structure and composition may be obtained through control of the oxidation conditions. In general, higher temperatures and longer times will lead to thicker films. While the structure of the films will generally be largely amorphous alumina, at low temperatures the amorphous alumina will contain a significant proportion of crystalline gamma alumina, and at higher temperatures the amorphous alumina will contain alpha alumina crystals. Such films are dense and strongly adherent to the alloy substrate.

It must be emphasized that the alumina layer must be extremely stable and adherent so that the catalytic surface formed thereon does not degrade during service. The requirement of adherency may be met by choosing the substrate alloy so that its coefficient of thermal expansion is close to that of the oxide layer. This minimizes thermal stresses which occur in service. Another factor which will improve the adherency of the oxide layer will be fulfilled when the volume of the oxide layer formed is close to the volume of the metal layer which is consumed during the formation of the oxide layer. When this criteria is satisfied spalling and flaking of the oxide layer will be minimized. The stability of the oxide layer may be improved by forming the oxide layer under conditions which result in the formation of high purity alumina so that electrical resistivity of the oxide layer is high. Cleanliness of the substrate alloy prior to oxidation is important. In order that the oxide layer be uniform, it is highly preferred that the substrate alloy be a single phase alloy.

The present invention will be made more clear through reference to the following illustrative examples.

EXAMPLE I

A nickel base alloy containing 4.5% aluminum, 3% silicon, and 2% chromium was prepared using conventional techniques. The alloy was processed by rolling and annealing to a gage of 0.030 inch and was then chemically cleaned. Samples of the alloy strip were then oxidized in the presence of moist air, as described above, at temperatures of 870° and 980°C for a time of 20 hours. Subsequent analysis using capacitance bridge techniques revealed the presence of alumina films having approximate thicknesses of 1900 and 6040 A respectively. Optical observations indicated that these films were of uniform density and thickness, which covered the surface completely, without any detectable defects therein. The noble metal catalyst was applied as described below.

EXAMPLE II

As previously noted, the process of the present invention is broadly applicable to nickel base single phase alloys comprising 2 to 6% by weight of aluminum. Particularly good results have been obtained in a preferred embodiment through the use as substrate of nickel base alloys containing 3 to 5% aluminum, 2 to 3.5% silicon, 3 to 5% chromium, 0.0 to 0.4% manganese, 0.0 to 1.0% magnesium and balance nickel.

Figure 2:
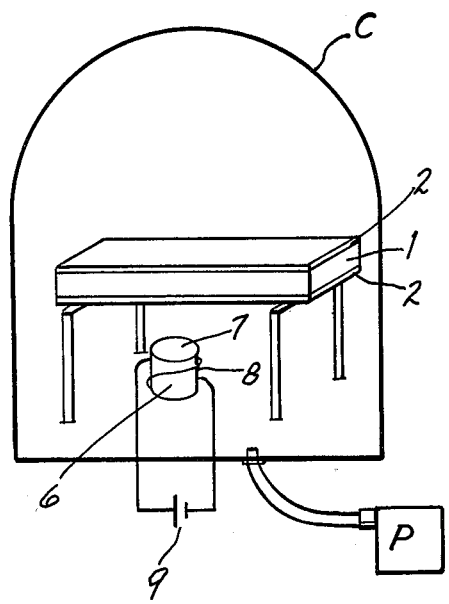
FIG. 2 shows in schematic form, the production of a composite catalytic material by a vapor deposition process.

Referring to the drawing, FIG. 1 shows the catalyst of the present invention in its final layered form. The nickel base alloy substrate 1 of the above composition, has on its surface an oxide layer 2 and on the surface of the oxide layer 2 is the layer 3 of noble metal catalyst. FIG. 2 illustrates a preferred method for applying the catalytic layer to the oxidized substrate. The nickel-aluminum alloy substrate 1 has on its surface an oxide layer 2, comprised mainly of $Al_2O_3$. Placed within a gas-tight chamber C, in close proximity to the oxidized substrate which is to be coated is a crucible 6 which contains the noble metal 7 to be deposited, which is heated by a resistance heating element 8, connected to a source of electric current 9. The vapor deposition occurs on heating the noble metal 7 to a sufficiently high temperature, the processing being performed in a vacuum maintained in chamber C by means of vacuum pump P.

Figure 3:
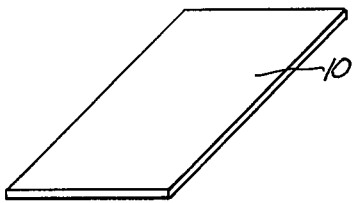
FIG. 3 shows a blank from which expanded metal mesh may be made.
Figure 4:
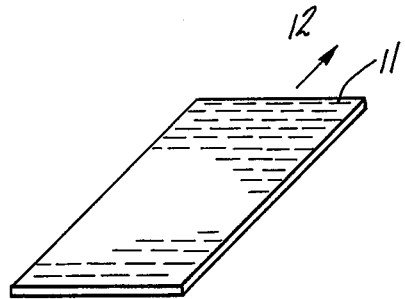
FIG. 4 shows the blank of FIG. 5 after it has been slit.
Figure 5A:
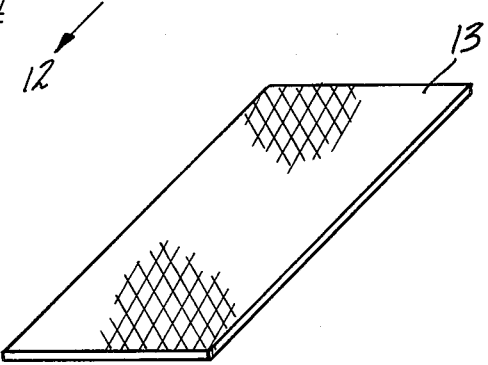
FIG. 5A shows expanded mesh which has been produced from the slit blank shown in FIG. 4.
Figure 5B:
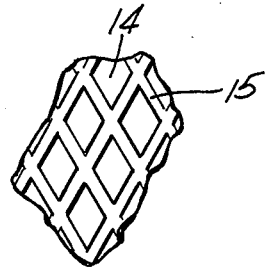
FIG. 5B shows the indicated portion of FIG. 5A greatly magnified.

FIGS. 3, 4 and 5 illustrate steps in the production of expanded metal mesh. FIG. 3 shows a strip of metal 10, the starting material from which a strip of expanded metal is produced. A series of parallel slits 11 are punched or cut through the metal strip as shown in FIG. 4, the slits having a length to width ratio on the order of 10 to 1. A tensile force is applied longitudinally along the strip, in a direction perpendicular to the long axis of the slits, as shown by the arrows 12. The tensile force expands the slits S resulting in a porous mesh 13 as shown in FIGS. 5A and 5B having a plurality of openings, 14 defined by metal strips 15. The provision of the catalyst of the present invention in expanded mesh form is advantageous because of its high ratio of surface area to weight, resulting in increased catalytic activity per unit weight of catalyst material. Expanded mesh is particularly adaptable for use in applications such as automobile catalytic converters wherein high flow rates of exhaust gases must be maintained. Expanded mesh also has a comparatively low heat capacity relative to its surface area and thus reaches operating temperature rapidly.

Because of the need to minimize damage to the oxide layer, it is preferred that the substrate be converted to expanded mesh form before the oxide layer is produced over its surface in the oxidation step. It will be understood that other forms of the layered catalyst may be provided which display a high ratio of surface area to volume.

Likewise, other methods may be employed for the deposition of the noble metal layer over the oxide surface of the nickel-aluminum alloy substrate. For example, this may be effected by the decomposition of a noble metal compound heated under vacuum in proximity to the substrate. In such processing, as well as in vaporization of the noble metal, the required heating may be accomplished, preferably under vacuum, by electrical resistance or induction means or by the use of electron beam heating or other sputtering techniques, with the application if desired of an electric field between the substrate and the supply of catalytic metal.

The deposition should be controlled to form an effective deposit of noble metal catalyst over the oxide surface of the substrate, which deposit has a thickness of 100 to 5,000 A, preferably between 200 and 2,000 A.

The alloy components of the noble metal layer are preferably chosen from the group consisting of platinum and palladium. However, other metals such as iridium, rhenium, osmium and ruthenium may be present in amounts from 0.001 to 20%, preferably from 0.001 to 5%, of the total, although their catalytic effectiveness is somewhat less than that of platinum or palladium. These other metals may occur in technical grades of platinum and palladium, which may be used effectively despite some decrease in catalytic efficiency. Preferably, the catalytic layer contains from 0.001 to 40% palladium and balance essentially from 60 to 100% platinum. In the most preferred embodiment, the catalytic layer contains 80 to 100% platinum and 0.001 to 20% palladium.

As noted previously, the oxide layer which is formed on the metallic substrate prior to the application of the catalytic layer serves to prevent the diffusion of the catalytic layer into the substrate. It is therefore important during processing that precautions be taken to minimize damage to, or disruption of, the oxide layer. For this reason, a vapor deposition technique is preferred for the application of the catalytic layer.

While particular embodiments of the invention have been described for the purpose of illustration, it will be understood that various modifications and adaptations thereof may be made in the scope and spirit of the invention as set forth in the appended claims.

What is claimed is:

1. A process for producing a catalyst for the removal of carbon monoxide and hydrocarbons from automobile exhaust gases comprising the steps of:
   A. providing a substrate of a nickel base single-phase alloy comprising in solid solution 2 to 6% by weight aluminum and balance of 50 to 98% essentially of nickel, said alloy being capable of forming an adherent oxide layer mainly of aluminum oxide;
   B. oxidizing the substrate alloy to produce the adherent alumina-rich layer at a temperature of from 350° to 1,000°F for a time of from 1 minute to 20 hours, said layer having a thickness of from 100 to 10,000 A; and
   C. applying a layer of metal to the surface of the oxide layer, said layer having a thickness from 100 to 5,000 A and containing from .001 to 40% palladium, from 0.001 to 20% of a metal chosen from the group consisting of iridium, rhenium, osmium, ruthenium, and mixtures thereof, and balance essentially platinum.

2. A process as in claim 1 wherein the thickness of the oxide layer is from 200 to 5,000 A.

3. A process as in claim 1 wherein the oxidation step is performed at a temperature of from 500° to 900°C.

4. A process as in claim 1 wherein the metal layer contains up to 20% palladium.

5. A process as in claim 1 wherein the metal contains up to 5% of a metal chosen from the group consisting of iridium, rhenium, osmium, ruthenium, and mixtures thereof.

6. A process as in claim 1 wherein the substrate alloy contains 2 to 6% aluminum, 0.5 to 4.0% silicon, 0.001 to 6.0% chromium, and balance essentially nickel.

7. A process as in claim 6 wherein the substrate alloy contains 0.001 to 1.0% magnesium.

8. A process as in claim 1 wherein the substrate alloy contains 4.5% aluminum, 3% silicon, and 2% chromium.

9. A catalyst for the diminution of automobile exhaust gases comprising:
   A. a substrate alloy containing in solid solution 2 to 6% aluminum and balance of 50 to 98% essentially of nickel, said alloy being capable of forming an adherent oxide layer mainly of alumina;
   B. an adherent alumina-rich layer formed on the surface of the substrate alloy by oxidation at 350° to 1,000°F for a time of 1 minute to 20 hours, said layer having a thickness of from 200 to 5,000 A; and
   C. a layer of metal on the surface of the oxide layer having a thickness of from 200 to 2,000 A and containing from 0.001 to 40% palladium, from 0.001 to 20% of a metal chosen from the group consisting of iridium, rhenium, osmium, ruthenium, and mixtures thereof, and balance essentially platinum.

10. A catalyst as in claim 9 wherein the substrate is an alloy containing 2 to 6% aluminum, 0.5 to 4.0% silicon, 0.001 to 6.0% chromium, and balance essentially nickel.

11. A catalyst as in claim 9 wherein the substrate is an alloy containing 3 to 5% aluminum, 2 to 3.5% silicon, 3 to 5% chromium, and balance essentially nickel.

12. A catalyst as in claim 9 wherein the substrate alloy contains 0.001 to 1.0% magnesium.

* * * * *